(12) United States Patent
Lee et al.

(10) Patent No.: US 8,862,108 B2
(45) Date of Patent: Oct. 14, 2014

(54) MOBILE TERMINAL AND METHOD FOR RECOMMENDING CALL COUNTERPART

(75) Inventors: Jungsu Lee, Seoul (KR); Jinwook Choi, Seoul (KR); Seungcheon Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/003,335

(22) PCT Filed: Jul. 30, 2010

(86) PCT No.: PCT/KR2010/005052
§ 371 (c)(1),
(2), (4) Date: Jan. 10, 2011

(87) PCT Pub. No.: WO2012/015092
PCT Pub. Date: Feb. 2, 2012

(65) Prior Publication Data
US 2013/0115930 A1 May 9, 2013

(51) Int. Cl.
*H04M 3/42* (2006.01)
*H04W 4/20* (2009.01)
*H04W 8/26* (2009.01)
*H04W 4/02* (2009.01)
*H04W 88/02* (2009.01)

(52) U.S. Cl.
CPC ............ *H04M 3/42042* (2013.01); *H04W 4/20* (2013.01); *H04W 8/26* (2013.01); *H04W 4/027* (2013.01); *H04W 88/02* (2013.01); *H04M 2250/60* (2013.01); *H04W 4/02* (2013.01)
USPC ......................................................... 455/415

(58) Field of Classification Search
USPC ............. 455/414.1, 414.2, 414.3, 414.4, 415; 379/93.23
See application file for complete search history.

(56) References Cited

U.S. PATENT DOCUMENTS

2006/0035632 A1* 2/2006 Sorvari et al. ................. 455/418
2006/0079201 A1* 4/2006 Chung et al. .................. 455/410

(Continued)

FOREIGN PATENT DOCUMENTS

| KR | 10-2006007282 A | 1/2006 |
| KR | 10-2007087464 A | 8/2007 |
| KR | 10-2010028286 A | 3/2010 |

OTHER PUBLICATIONS

PCT International Search Report dated Apr. 22, 2011 for Application No. PCT/KR2010/005052, Non-English language, 9 Pages.

*Primary Examiner* — Jinsong Hu
*Assistant Examiner* — Erica Navar
(74) *Attorney, Agent, or Firm* — Fish & Richardson P.C.

(57) ABSTRACT

The present invention relates to a mobile terminal capable of providing a phone number of an anticipated call origination counterpart along with associated supplementary information according to a user's communication pattern, time information at which the mobile terminal is in use, or location information of the mobile terminal, thereby guaranteeing a rapid and convenient accessibility with respect to the call origination counterpart, and a method for recommending a call origination counterpart.

In order to achieve the above object, there is provided a method for recommending a call origination counterpart of a mobile terminal, including: generating a communication pattern based on a counterpart's phone number and information related to a time or a location; acquiring supplementary information associated with the phone number; selecting a phone number corresponding to a current time or a current location based on the communication pattern; and displaying the selected phone number or the supplementary information associated with the selected phone number.

16 Claims, 9 Drawing Sheets

(56) References Cited

U.S. PATENT DOCUMENTS

| | | | |
|---|---|---|---|
| 2008/0147639 A1* | 6/2008 | Hartman et al. | 707/5 |
| 2009/0163183 A1 | 6/2009 | O Donoghue et al. | |
| 2009/0228513 A1* | 9/2009 | Tian | 707/102 |
| 2010/0002859 A1* | 1/2010 | Hepworth et al. | 379/140 |
| 2010/0104081 A1* | 4/2010 | Berman et al. | 379/201.02 |

* cited by examiner

FIG. 4A

| PHONE NUMBER | DATE | DAY | TIME | PLACE | CALL TIME | |
|---|---|---|---|---|---|---|
| A | 7.4 | SUN | 09:03 | HOME | 2:30 | |
| A | 7.5 | MON | 09:19 | OFFICE | 3:20 | |
| A | 7.6 | TUE | 08:53 | OFFICE | 5:15 | 311 |
| B | 7.7 | WED | 10:07 | OFFICE | 1:07 | 312 |
| A | 7.8 | THU | 09:34 | OFFICE | 9:04 | |
| A | 7.9 | FRI | 09:12 | OFFICE | 3:30 | |
| C | 7.10 | SAT | 13:36 | HOME | 2:10 | 314 |
| C | 7.11 | SUN | 20:36 | HOME | 1:34 | |
| A | 7.12 | MON | 07:52 | HOME | 7:25 | |
| B | 7.13 | TUE | 15:24 | OFFICE | 5:15 | 316 |
| D | 7.14 | WED | 09:48 | OFFICE | 4:36 | 313 |
| A | 7.15 | THU | 10:19 | OFFICE | 3:27 | |
| D | 7.16 | FRI | 19:02 | HOME | 1:15 | |
| C | 7.17 | SAT | 15:23 | HOME | 4:50 | 315 |

| TIME | SUN | MON | TUE | WED | THU | FRI | SAT |
|---|---|---|---|---|---|---|---|
| 00:00-07:59 | | A | | | | | |
| 08:00-11:59 | A | A | A | D,B | A | A | |
| 12:00-17:59 | C | | C | | | | C |
| 18:00-23:59 | | | | | | D | C |

| TIME | HOME | OFFICE |
|---|---|---|
| 00:00-07:59 | A | |
| 08:00-11:59 | A | A,B,D |
| 12:00-17:59 | C | B |
| 18:00-23:59 | C,D | |

330

332  334

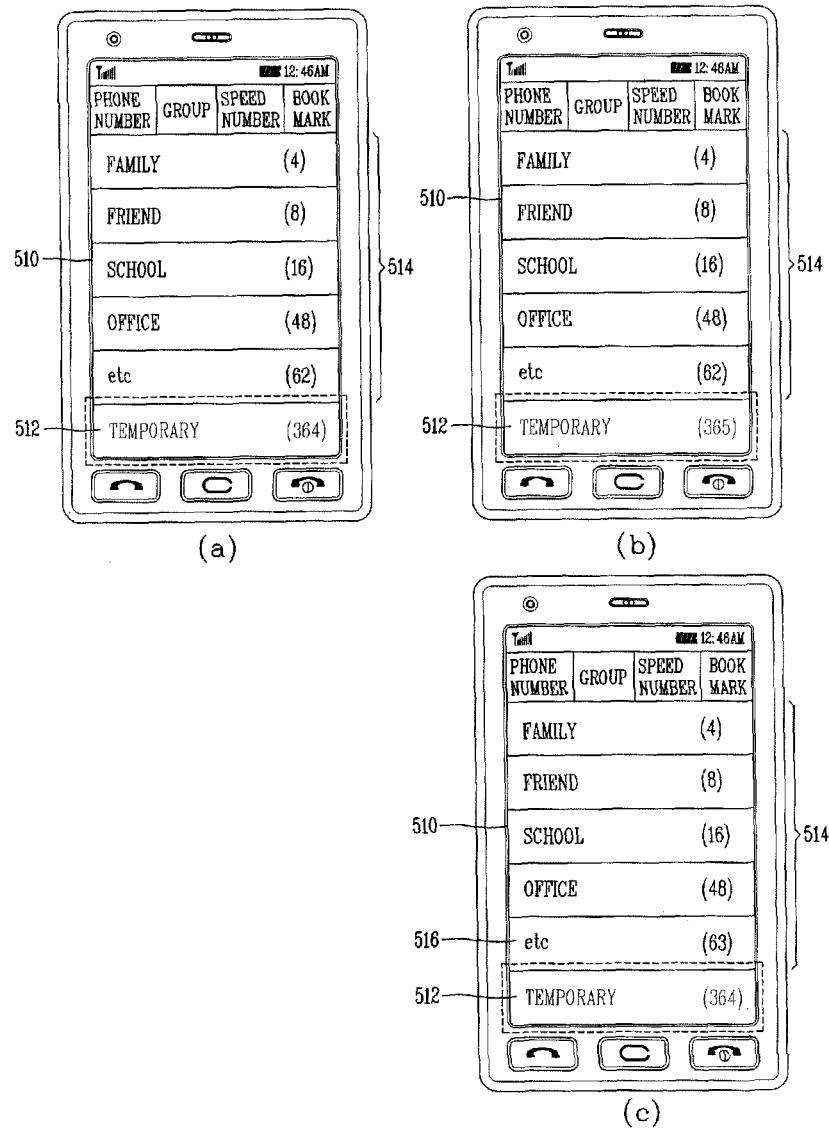

MOBILE TERMINAL AND METHOD FOR RECOMMENDING CALL COUNTERPART

CROSS REFERENCE TO RELATED APPLICATIONS

This application is a U.S. National Phase Application under 35 U.S.C. §371 of International Application PCT/KR2010/005052, filed on Jul. 30, 2010.

TECHNICAL FIELD

The present invention relates to a mobile terminal and a method for recommending a call counterpart and, more particularly, to a mobile terminal for recommending a call counterpart according to a usage environment of the mobile terminal and a method for recommending a call counterpart in the mobile terminal.

BACKGROUND ART

Recently, as mobile terminals provide various, complex functions, a consideration of the convenience of user interfaces (UIs) including a menu display, and the like, is required.

TECHNICAL GIST OF THE PRESENT INVENTION

Therefore, it is an object of the present invention to provide a mobile terminal capable of providing a phone number of an anticipated call origination counterpart or associated supplementary information according to a user's communication pattern, time information at which the mobile terminal is in use, or location information of the mobile terminal, thereby guaranteeing a rapid and convenient accessibility with respect to the call origination counterpart, and a method for recommending a call origination counterpart.

In order to achieve the above object, there is provided a method for recommending a call origination counterpart of a mobile terminal, including: generating a communication pattern based on a counterpart's phone number and information related to a time or a location; acquiring supplementary information associated with the phone number; selecting a phone number corresponding to a current time or a current location based on the communication pattern; and displaying the selected phone number or the supplementary information associated with the selected phone number.

The acquiring of the supplementary information may include: checking the supplementary information associated with the phone number; and storing the checked supplementary information.

In acquiring the supplementary information, the supplementary information may be acquired from a server or a memory of the mobile terminal.

In acquiring the supplementary information, the supplementary information associated with the phone number may be acquired periodically.

The acquiring of the supplementary information may include: storing the phone number and the supplementary information associated with the phone number in a first list of a contacts (namely, where to make contact), and the method may further include: storing the phone number and the supplementary information associated with the phone number stored in the first list, in a second list of the contacts base on the number of times of call communication or a communication duration with respect to the phone number stored in the first list.

The acquiring of the supplementary information may include: storing the phone number and the supplementary information associated with the phone number in the first list of the contacts, and the method may further include: storing the phone number and the supplementary information associated with the phone number stored in the first list, in the second list of the contacts base on a user input.

In the displaying operation, the phone number stored in the first list or the supplementary information associated with the phone number stored in the first list may be displayed to be discriminated from the phone number stored in the second list or the supplementary information associated with the phone number stored in the second list.

In selecting the phone number, a phone number corresponding to the current time or the current location is selected further based on schedule related data of a user.

The schedule related data of the user may be log data of a schedule management application.

In displaying the selected phone number or the supplementary information associated with the selected phone number, a communication time or a communication location with respect to the selected phone number are additionally displayed.

The selected phone number includes a plurality of phone numbers, and, in displaying the selected phone number or the supplementary information associated with the selected phone number, the selected phone number or the supplementary information associated with the selected phone number may be displayed based on the number of times of call communication or communication duration.

The displaying of the selected phone number or the supplementary information associated with the selected phone number may include: displaying the selected phone number or the supplementary information associated with the selected phone number in a first area; and displaying a counterpart's phone number of recent call communication or supplementary information associated with the counterpart's phone number of the recent call communication in a second area.

In order to achieve the above object, there is also provided a mobile terminal including: a pattern management unit configured to generate a communication pattern based on a counterpart's phone number and information related to a time or a location; a contacts management unit configured to acquire supplementary information associated with the phone number; and a recommendation controller configured to select a phone number corresponding to a current time or a current location based on the communication pattern and display the selected phone number or supplementary information associated with the selected phone number.

The contacts management unit may acquire the supplementary information from a server or a memory of the mobile terminal.

The contacts management unit may acquire the supplementary information associated with the phone number periodically.

The contacts management unit may store the phone number and the supplementary information associated with the phone number in a first list of a contacts and store the phone number and the supplementary information associated with the phone number stored in the first list, in a second list of the contacts based on the number of times of call communication or a communication duration with respect to the phone number stored in the first list.

The contacts management unit may store the phone number and the supplementary information associated with the phone number in the first list of a contacts, and store the phone number and the supplementary information associated with the phone number stored in the first list, in the second list of the contacts based on a user input.

The recommendation controller may select a phone number corresponding to the current time or a current location further based on schedule related data of a user.

The schedule related data of the user may be log data of a schedule management application.

The recommendation controller may additionally display a communication time or a communication location with respect to the selected phone number.

BRIEF DESCRIPTION OF THE DRAWINGS

FIG. 4A is a view showing a call list table according to an exemplary embodiment of the present invention;

FIG. 4B is a view showing an example of a pattern information table based on the call list table 310 illustrated in FIG. 4A;

FIG. 4C is a view showing another example of a pattern information table based on the call list table 310 illustrated in FIG. 4A;

FIGS. 6A to 6C are overview of display screens illustrating displaying of contacts (i.e., where to make contact) according to an exemplary embodiment of the present invention;

MODE FOR CARRYING OUT THE PREFERRED EMBODIMENTS

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Definition of Communication Pattern

The term 'communication pattern' described in the present disclosure refers to repeatedly requesting or receiving a call connection in a particular context. For example, a communication pattern refers to repeatedly originating (or transmitting) a call to a particular counterpart at a particular time and at a particular place.

Definition of Supplementary Information

The term 'supplementary information' described in the present disclosure refers to information based on which a phone number can be discriminated or differentiated from another phone number in terms of meaning (e.g., the name, address, e-mail, address, etc., of the user of the mobile terminal).

Definition of a Contacts

The term 'a contacts (or phone book)' described in the present disclosure refers to a database in which a phone number of an acquaintance of a mobile terminal use is stored along with supplementary information related to the acquaintance (e.g., the name, address, e-mail address, etc., of the acquaintance).

General Description of Mobile Terminal

Figure 1:
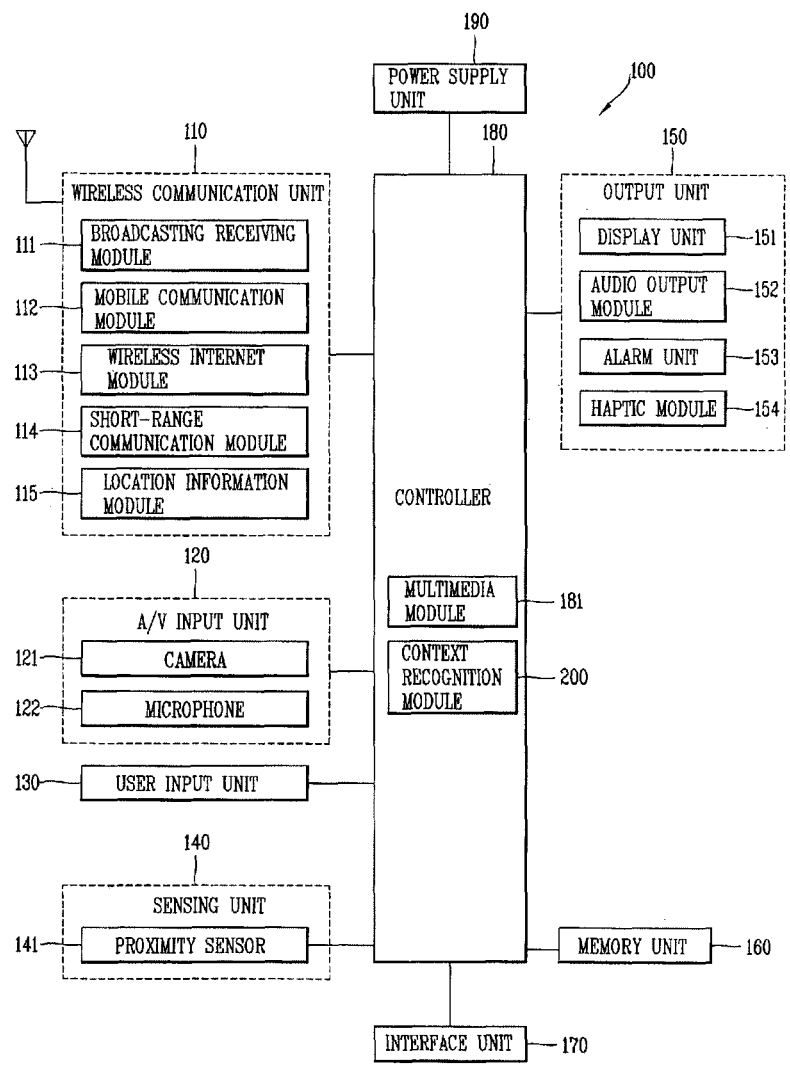
FIG. 1 is a schematic block diagram of a mobile terminal according to an exemplary embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented. The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141 (not shown).

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor has a considerably longer life span compared with a contact type sensor, and it can be utilized for various purposes.

Examples of the proximity sensor may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

According to an exemplary embodiment of the present invention, the controller 180 may include a context recognition module 200. The context recognition module 200 will be described in detail later with reference to FIG. 2.

Description of a Function of Recommending a Call Origination Counterpart

Figure 2:
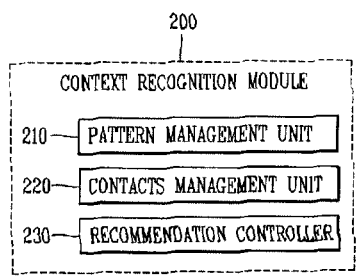
FIG. 2 is a detailed block diagram of a context recognition module 200 illustrated in FIG. 1.

FIG. 2 is a detailed block diagram of a context recognition module 200 illustrated in FIG. 1. The context recognition module 200 according to an exemplary embodiment of the present invention includes a pattern management unit 210, a contacts management unit 220, and recommendation controller 230.

The pattern management unit 210 generates a communication pattern based on a counterpart's phone number and information related to a time or a location.

When a call connection to the counterpart is requested or a request for a call connection is received from the counterpart, the pattern management unit 210 checks the counterpart's phone number and the information related to the time or the location of the mobile terminal 100. The request for a call connection may include a request for a call connection for a call or a request for a call connection for a text message. The pattern management unit 210 stores the checked counterpart's phone number and information related to the time or the location in the memory 160.

Also, the pattern management unit 210 generates a communication pattern based on the counterpart's phone number and the information related to the time or the location. When the call connection to the counterpart is requested or when a request for a call connection is received from the counterpart, the pattern management unit 210 generates a communication pattern based on the counterpart's phone number and the information related to the time or the location. Here, the communication pattern is generated periodically or the communication pattern is generated at occurrence of a certain number of request. The pattern management unit 210 stores the generated pattern in the memory 160.

The contacts management unit 220 acquires supplementary information associated with the counterpart's phone number. The contacts management unit 220 checks the supplementary information associated with the counterpart's phone number and stores the checked supplementary information in the memory 160.

In an exemplary embodiment, the contacts management unit 220 may acquire supplementary information associated with the counterpart's phone number from a server or the memory 160. The server or the memory 160 stores the counterpart's phone number and the supplementary information associated with the counterpart's phone number and provides the supplementary information associated with the counterpart's phone number according to a request from the contacts management unit 220.

Also, in an exemplary embodiment, when the contacts management unit 220 requests a call connection to the counterpart or receives a request for a call connection from the counterpart, the supplementary information associated with the counterpart's phone number can be acquired periodically or at occurrence of a certain number of request by the contacts management unit 220.

Also, in an exemplary embodiment, the contacts management unit 220 stores the counterpart's phone number and the supplementary information associated with the counterpart's phone number in a contacts. The contacts may include first and second lists. The first list includes a phone number whose supplement information has been acquired by the contacts management unit 220 and acquired supplementary information associated with the phone number. The second list includes a phone number whose supplementary information has been inputted by the user and supplementary information associated with the phone number. Also, the second list stores a phone number selected according to a user input, or the like, and supplementary information associated with the selected phone number among the phone number and the supplementary information associated with the phone number stored in the first list.

For example, the contacts management unit 220 stores the counterpart's phone number and supplementary information associated with the counterpart's phone number in the first list. Also, the contacts management unit 220 may store the phone number stored in the first list and the supplementary information associated with the phone number stored in the first list, in the second list based on the number of times of call communication or a communication duration with respect to the phone number stored in the first list.

In this case, the phone number stored in the first list and the supplementary information associated with the phone number stored in the first list may be stored in a cutoff number group of the second list based on the number of times of call communication or a communication duration with respect to the phone number stored in the first list. For example, when an average call time with respect to a particular phone number stored in the first list is shorter than 5 seconds, the contacts management unit 220 may determine the particular phone number as a cutoff target and store it in the cutoff number group of the second list.

Or, the contacts management unit 220 may store the phone number stored in the first list and the supplementary information associated with the phone number stored in the first list in the second list based on a user input. Accordingly, the user can manage the phone number stored in the first list and the supplementary information associated with the phone number stored in the first list separately from the second list.

Also, in an exemplary embodiment of the present invention, the contacts management unit 220 may display the phone number or the supplementary information stored in the first list such that they are discriminated or differentiated from the phone number or the supplementary information stored in the second list. For example, the phone number or the supplementary information stored in the first list may be displayed such that their size, shape, or color is different from that of the phone number or the supplementary information stored in the second list. Thus, the user can discriminate the phone number or the supplementary information stored in the first list from the phone number or the supplementary information stored in the second list.

The recommendation controller 230 selects a phone number corresponding to a current time or a current location based on the communication pattern. The recommendation controller 230 may check a current time upon receiving a signal from a repeater or based on an installed counter. Also, the recommendation controller 230 may check the current location of the mobile terminal 100 from the wireless communication unit 110 (e.g., the location information module 115). The recommendation controller 230 selects a phone number corresponding to the current time or the current location from the communication pattern stored in the memory 160.

In an exemplary embodiment of the present invention, the recommendation controller 230 may select the phone number corresponding to the current time or the current location based on schedule related data of the user. Also, the schedule related data of the user may be log data of a schedule management application. The recommendation controller 230 may check a user's schedule corresponding to the current time or the current location from the schedule related data of the user and extract a phone number from the checked schedule.

The recommendation controller 230 displays the selected phone number or supplementary information associated with the selected phone number on the display unit 151.

In an exemplary embodiment of the present invention, the recommendation controller 230 may further display a communication time or a communication location with respect to the selected phone number along with the selected phone number or the supplementary information associated with the selected phone number. For example, the recommendation controller 230 may display call records with respect to the selected phone number and the user may assume the reason why the selected phone number is displayed.

Also, in an exemplary embodiment of the present invention, the phone number selected by the recommendation controller 230 may include a plurality of phone numbers, and the recommendation controller 230 may display the selected phone number or supplementary information associated with the selected phone number based on the number of times of call communication or a communication duration with respect to each of the plurality of phone numbers. For example, whether to display the plurality of phone numbers and the display order of the plurality of phone numbers may be determined according to the number of times of call communication or a communication duration.

Also, in an exemplary embodiment of the present invention, the recommendation controller 230 may display the selected phone number or the supplementary information associated with the selected phone number in a first area, and a counterpart's phone number of the latest call communication or supplementary information associated with the counterpart's phone number of the latest call communication in a second area. For example, when the latest call list menu is selected by the user, the recommendation controller 230 may display the selected phone number along with the counterpart's phone number of the latest call communication on the display unit 151.

Figure 3:
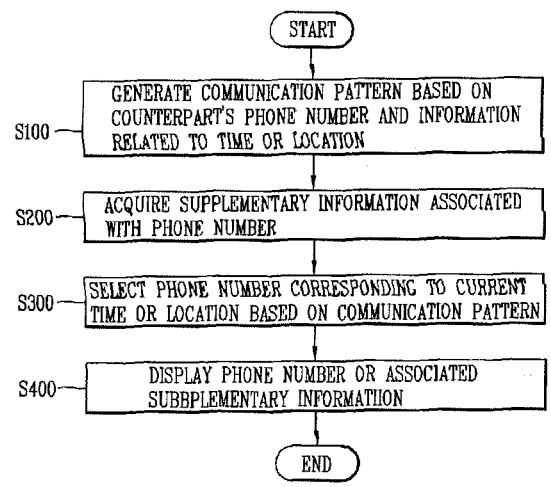
FIG. 3 is a flow chart illustrating a process of recommending a call origination counterpart according to an exemplary embodiment of the present invention.

FIG. 3 is a flow chart illustrating a process of recommending a call origination counterpart according to an exemplary embodiment of the present invention.

The pattern management unit 210 generates a communication pattern based on a counterpart's phone number and information related to a time or a location (step S100). When a call connection to the counterpart is requested or a request for a call connection is received from the counterpart, the pattern management unit 210 checks the counterpart's phone number and the information related to the time or the location of the mobile terminal 100. The pattern management unit 210 stores the checked counterpart's phone number and information related to the time or the location in the memory 160.

Also, the pattern management unit 210 generates a communication pattern based on the counterpart's phone number and the information related to the time or the location. When the call connection to the counterpart is requested or when a request for a call connection is received from the counterpart, the pattern management unit 210 generates a communication pattern based on the counterpart's phone number and the information related to the time or the location. Here, the communication pattern is generated periodically or the communication pattern is generated at occurrence of a certain number of request. The pattern management unit 210 stores the generated pattern in the memory 160.

The contacts management unit 222 acquires supplementary information associated with the counterpart's phone number (step S200). The contacts management unit 220 checks the supplementary information associated with the counterpart's phone number and stores the checked supplementary information in the memory 160.

The recommendation controller 230 selects a phone number corresponding to a current time or a current location based on a communication pattern (step S300). The recommendation controller 230 may check a current time upon receiving a signal from a repeater or based on an installed counter. Also, the recommendation controller 230 may check the current location of the mobile terminal 100 from the wireless communication unit 110 (e.g., the location information module 115). The recommendation controller 230 selects a phone number corresponding to the current time or the current location from the communication pattern stored in the memory 160.

The recommendation controller 230 displays the selected phone number or supplementary information associated with the selected phone number on the display unit 151 (step S400).

FIG. 4A is a view showing a call list table according to an exemplary embodiment of the present invention. The call list table 310 includes a counterpart's phone number, time information such as date, day, time, location information such as a place, or the like, and a call time checked when the user request a call connection to the counterpart or when the user receives a request for a call connection from the counterpart through the mobile terminal 100. The call list table 310 in FIG. 4A includes phone numbers of counterparts, date, day, time, place, and a call time checked when the user has requested a call connection or when the user has received a request for a call connection during the last two weeks.

FIG. 4B is a view showing an example of a pattern information table based on the call list table 310 illustrated in FIG. 4A. In an exemplary embodiment of the present invention, the pattern information table 320 includes a time based call origination recommendation counterpart with respect to each day. Each call origination recommendation counterpart is determined based on time information corresponding to each item in the call list table 310. For example, a call origination recommendation counterpart 322 between 08:00 to 11:59, Tuesday, is determined from the item 311 included in the call list table 310 in FIG. 4A, and a call origination recommendation counterpart 324 between 08:00 to 11:59, Wednesday, is determined from the items 312 and 313 included in the call list table 310 of FIG. 4A.

FIG. 4C is a view showing another example of a pattern information table based on the call list table 310 illustrated in FIG. 4A. In an exemplary embodiment of the present invention, a pattern information table 330 includes a time based call origination recommendation counterpart with respect to each place. Each of the call origination recommendation counterparts are determined based on time information and location information corresponding to each of the items from the call list table 310 of FIG. 4A. For example, a call origination recommendation counterpart 332 between 12:00 and 17:59 at home is determined from the items 314 and 315 included in the call list table 310 of FIG. 4A, and a call origination recommendation counterpart 334 between 12:00 and 17:59 in the office is determined from the item 316 included in the call list table 310 of FIG. 4A.

In this manner, the pattern table may be configured to have various forms according to time information or location information checked when a call connection to the counterpart is requested or when a request for a call connection is received at the mobile terminal 100. In an exemplary embodiment of the present invention, in generating the pattern table, information other than the time information or the location information may be used. Typical information is information related to the motion of the mobile terminal 100. In this case, the mobile terminal 100 may further include an acceleration sensor, a gyro sensor, a geomagnetic sensor, or the like.

Figure 5A:
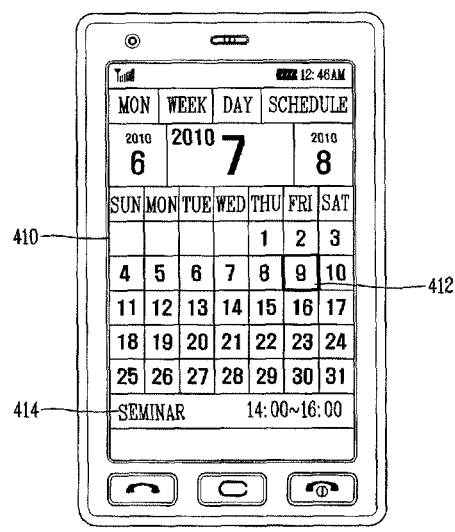
FIGS. 5A and 5B are overviews of display screens illustrating executed screens of a schedule management application according to an exemplary embodiment of the present invention.

FIG. 5A is an overview of a display screen illustrating an executed schedule management application according to an exemplary embodiment of the present invention. The user manages data related to the user's schedule by using an application. The user's schedule may include an item related to a call origination counterpart, and a call origination recommendation counterpart may be determined based on this item. The user can manage information related to a time, a place, and an associated phone number with respect to each of schedules stored through the schedule management application. For example, when a particular date 412 is selected from the schedule list 410 of the schedule management application, a schedule list 414 included in the selected particular date is displayed.

Figure 5B:
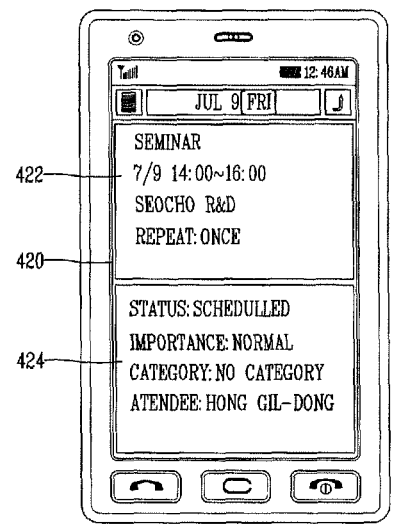

FIG. 5B is an overview of a display screen illustrating an executed schedule management application according to an exemplary embodiment of the present invention. When one item of the schedule list 414 included in the selected particular date in FIG. 5A is selected, detailed information screen 420 related to the selected item is displayed. In an exemplary embodiment of the present invention, the detailed information screen 420 includes an area 422 including information on a time and a place related to a schedule and an area 424 including information on a participant related to the schedule. The information on the time or the place related to the schedule and the information on the participant may be a recommendation basis of a call origination counterpart along with the communication pattern.

For example, with reference to FIG. 5B, when a current time is 10:00 a.m., July 9, because there is a possibility that the user will make a call to the participant of a seminar to be held in four hours, a phone number of Hong Kil-dong, the participant, is recommended as a call origination counterpart. Also, when a current location is Seocho R&D, the phone number of Hong Kil-dong, the participant of the seminar scheduled at Seocho R&D, may be recommended as a call origination counterpart.

FIG. 6A is an overview of a display screen illustrating contacts according to an exemplary embodiment of the present invention. The contacts 510 include a first list 512 and a second list 514. The first list 512 stores a phone number whose supplementary information has been acquired by the contacts management unit 220 and the associated supplementary information. The second list 514 stores a phone number whose supplementary information has been inputted by the user and the associated supplementary information or stores a phone number selected according to a user input, or the like, and associated supplementary information from among the phone number and the associated supplementary information stored in the first list 512.

Here, the phone number and the associated supplementary information included in the first list 512 and the phone number and the associated supplementary information included in the second list 514 may be discriminately or differentially displayed. For example, the phone number and the associated supplementary information included in the first list may be displayed such that their size, shape, or color is different from that of the phone number and the associated supplementary information included in the second list. Also, the phone number and the associated supplementary information included in the first list may not be displayed on the screen and only the phone number and the associated supplementary information included in the second list may be displayed on the screen.

FIG. 6B is an overview of a display screen illustrating contacts according to an exemplary embodiment of the present invention. When the user of the mobile terminal 100 requests a call connection to a counterpart or when the user receives a request for a call connection from the counterpart, the contacts controller 220 acquires supplementary information associated with the counterpart's phone number. In this case, the counterpart's phone number and the associated supplementary information may be stored in the first list 512.

After the user requests a call connection to the counterpart or after the user receives a request for a call connection from the counterpart, it is noted that the number of phone numbers stored in the first list 512 in FIG. 6B has been increased by one compared with the number of the phone numbers stored in the first list 512 of FIG. 6A.

FIG. 6c is an overview of a display screen illustrating contacts according to an exemplary embodiment of the present invention. The user may store the phone number and the associated supplementary information stored in the first list 512, in the second list 514. Or, the user may store the phone number and the associated supplementary information stored in the first list 512, in the second list 514 based on the number of times of call communication or a communication duration with respect to the phone number stored in the first list 512. For example, when the number of times of call communication with respect to the phone number stored in the first list 512 is five times or larger, or when a communication duration is greater than 10 minutes or longer, the phone number and the associated supplementary information stored in the first list 512 may be stored in the second list 514.

In this case, as the phone number and the associated supplementary information stored in the first list 512 are stored in the second list 514, it is noted that the number of phone numbers stored in the second list 514 of FIG. 6c has been increased by 1 in etc group 516 compared with the number of phone numbers stored in the second list 514 of FIG. 6B. Also, in this case, the phone number and the associated supplementary information stored in the first list 512 may be deleted from the first list 512, and accordingly, it may be noted that the number of phone numbers stored in the first list has been reduced by 1 compared with the number of phone numbers stored in the first list 512 of FIG. 6B.

Figure 7A:
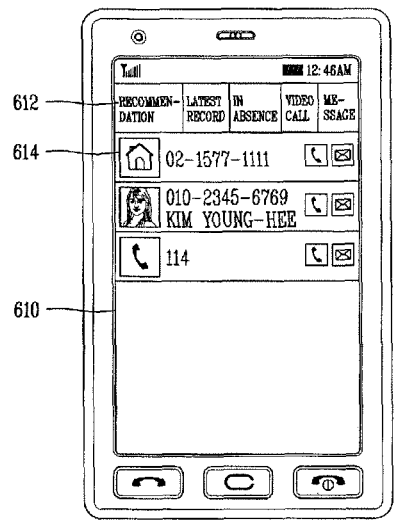
FIG. 7A is an overview of a display screen illustrating displaying of an example of a call origination recommendation counterpart according to an exemplary embodiment of the present invention.

FIG. 7A is an overview of a display screen illustrating displaying of an example of a call origination recommendation counterpart according to an exemplary embodiment of the present invention. When a phone number corresponding to a current time or a current location is selected based on the communication pattern in response to a request for displaying a call origination recommendation counterpart, the selected phone number or associated supplementary information may be displayed on the screen.

The request for displaying a call origination recommendation counterpart may include, for example, a case in which a call menu is selected or a menu corresponding to a call list is selected by the user. In this case, a call list 610 may include a recommendation list, the latest record, in absence, video call, and message tabs. When a recommendation list tab 612 is selected, a selected phone number or associated supplementary information item 614 may be displayed on the call list 610.

In an exemplary embodiment of the present invention, the selected phone number or the associated supplementary information item 614 may include a plurality of phone numbers. In this case, whether to display the selected phone number or the associated supplementary information or the display order may be determined based on the number of times of call communication or a communication duration with respect to each of the plurality of phone numbers. It is noted that the selected phone number or associated supplementary information item 614 includes three phone numbers or associated supplementary information in order according to the number of times of call communication or a call duration.

Figure 7B:
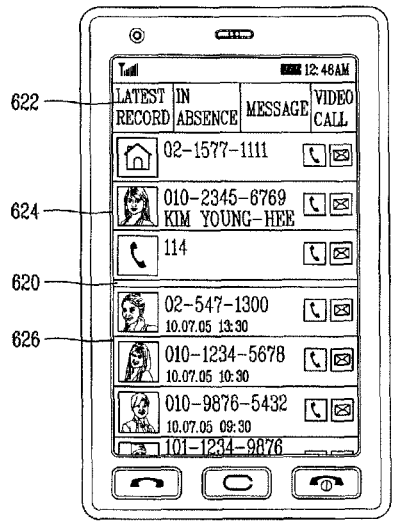
FIG. 7B is an overview of a display screen illustrating displaying of another example of a call origination recommendation counterpart according to an exemplary embodiment of the present invention.

FIG. 7B is an overview of a display screen illustrating displaying of another example of a call origination recommendation counterpart according to an exemplary embodiment of the present invention. In this exemplary embodiment, a call list 620 may include the latest record, in absence, video call, and message tabs. When the latest record tab 622 is selected, a selected phone number and associated supplementary information item 624 may be displayed on a first area, and the latest call record 626 may be displayed on a second area.

Figure 8A:
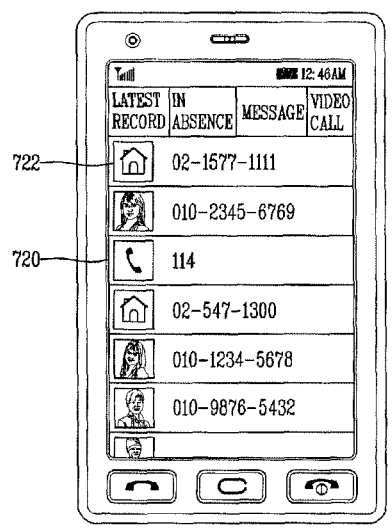
FIGS. 8A and 8B are overviews of display screens illustrating storing of a phone number in a contacts according to an exemplary embodiment of the present invention.
Figure 8B:
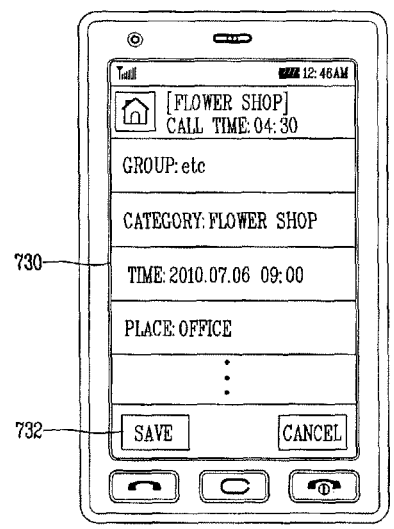

FIGS. 8A and 8B are overviews of display screens illustrating storing of a phone number in a contacts according to an exemplary embodiment of the present invention. With reference to FIG. 8A, when the user selects the call menu or the latest call record menu, the latest call record screen 720 is displayed. The latest call record screen 720 is a screen displaying the counterpart's phone number or supplementary information associated with the phone number when the user recently has requested a call connection to the counterpart or when the user has received a request for a call connection from the counterpart.

With reference to FIG. 8B, FIG. 8B shows a display screen 730 displaying supplementary information, a call time and a call place with respect to a phone number 722 selected from among the phone numbers displayed on the latest call record screen 720 of FIG. 8A. When a save menu 732 is selected by the user, the selected phone number 722 and supplementary information associated with the selected phone number 722 are stored in the contacts.

Figure 9:
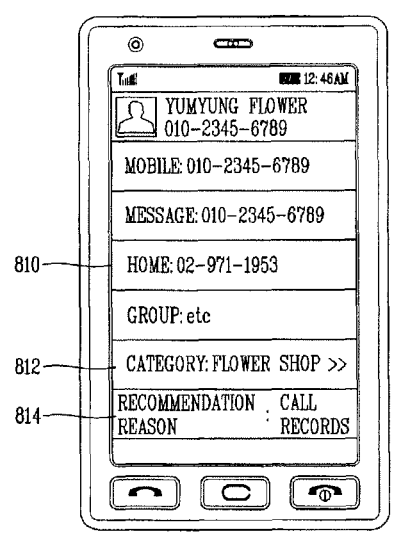
FIG. 9 is an overview of a display screen illustrating displaying of detailed information of a call origination recommendation counterpart according to an exemplary embodiment of the present invention.

FIG. 9 is an overview of a display screen illustrating displaying of detailed information of a call origination recommendation counterpart according to an exemplary embodiment of the present invention. When any one of the selected phone number or associated supplementary information item 614 or 624 is selected from the display screen of the call origination recommendation counterpart of FIG. 7A or FIG. 7B, a detailed information screen 810 with respect to the selected item is displayed. The detailed information screen 810 may be displayed to include a phone number item, a supplementary information item, a category item 812 and a recommendation reason item 814.

For example, when a recommendation counterpart is a person, the category item 812 may include information on an occupation, and when the recommendation counterpart is a business, the category item 812 may include information on the type of the business. Also, the recommendation reason item 814 may simply represent the reason why the corresponding item is recommended, and it may include any one of call records, message transmission and reception records, and schedule related data.

Figure 10A:
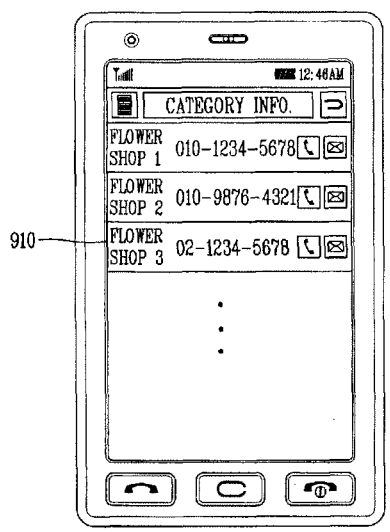
FIG. 10A is an overview of a display screen illustrating displaying of call origination counterpart recommendation based on category information according to an exemplary embodiment of the present invention.

FIG. 10A is an overview of a display screen illustrating displaying of a call origination counterpart recommendation based on category information according to an exemplary embodiment of the present invention. The user may select the category item 812 from the detailed information screen 810 of FIG. 9. When the category item 812 is selected, a screen of a call origination counterpart recommendation having the same category as that of the call origination recommendation counterpart is displayed. In an exemplary embodiment of the present invention, the mobile terminal 100 displays a screen 910 of a call origination counterpart recommendation having the same category as that of the call origination recommendation counterpart based on the current location.

Figure 10B:
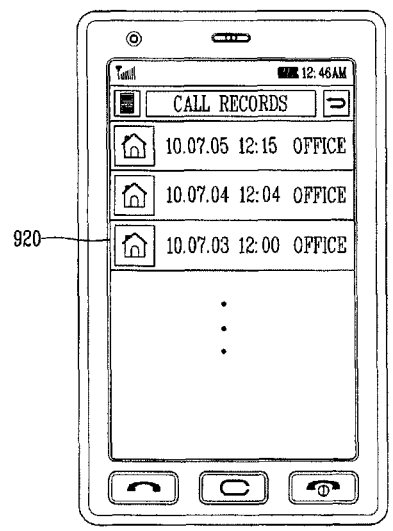
FIG. 10B is an overview of a display screen illustrating displaying of detailed information of a recommendation reason according to an exemplary embodiment of the present invention.

FIG. 10B is an overview of a display screen illustrating displaying of detailed information of a recommendation reason according to an exemplary embodiment of the present invention. The user may select the recommendation reason item 814 from the detailed information screen 810 of FIG. 9. When the recommendation reason item 814 is selected, detailed information screen image 920 of the recommendation reason is displayed. In an exemplary embodiment of the present invention, the detailed information screen 920 of the recommendation reason includes information regarding a call time or a call location with respect to the call origination recommendation counterpart.

According to an exemplary embodiment of the present invention, because the mobile terminal provides information related to a call origination counterpart predicted according to a context based on a communication pattern of the user, the user can easily search for information on the counterpart to which the user wants to make a call and the process to be performed to communicate with the counterpart can be reduced. Thus, a user inconvenience of searching for call origination counterparts one by one can be reduced. In particular, when it is used in association with the schedule management application, the schedule can be conveniently performed, and when supplementary information associated with a phone number not stored in a contacts is provided as well, information related to the corresponding phone number can be easily recognized.

The present invention has been described more fully with reference to the accompanying drawings, in which exemplary embodiments of the invention are shown. First, terms or words used in the present specification and the claims should not be construed as being limited to general or literal meaning, but should be construed in meaning and concept that coincide with the technical spirit of the invention. Thus, configurations shown in embodiments and the drawings of the present invention rather is an example of the most exemplary embodiment and does not represent all of the technical spirit of the invention. Thus, it will be understood that various equivalents and modifications that replace the configurations are possible when filing the present application.

The invention claimed is:

1. A method for recommending a call origination counterpart of a mobile terminal, the method comprising:
    generating, at the mobile terminal, a communication pattern based on a counterpart's phone number and information related to a time and a location at which a call connection was established with a device using the counterpart's phone number;
    requesting, by the mobile terminal to a server, supplementary information associated with the counterpart's phone number, wherein the supplementary information distinguishes the counterpart's phone number from other phone numbers and provides additional information associated with the counterpart's phone number;
    storing, in a memory of the mobile terminal, the communication pattern with the supplementary information received from the server;
    selecting at least one recommendation phone number corresponding to a current time and a current location based on communication patterns stored in the memory; and
    displaying the selected at least one recommendation phone number with the supplementary information;
    wherein storing the supplementary information comprises:
    storing the counterpart's phone number and the supplementary information associated with the counterpart's phone number in a first list of contacts; and
    storing, in a second list of contacts, the counterpart's phone number and the supplementary information associated with the counterpart's phone number that are stored in the first list based on a number of times of call communication or a communication duration with respect to the counterpart's phone number stored in the first list.

2. The method of claim 1, wherein the supplementary information associated with the counterpart's phone number is requested periodically.

3. The method of claim 1, wherein, in storing the counterpart's phone number and the supplementary information associated with the counterpart's phone in the second list of contacts, the counterpart's phone number and the supplementary information associated with the counterpart's phone are stored in the second list of contacts further based on a user input.

4. The method of claim 1, wherein, in selecting the at least one recommendation phone number corresponding to a current time and a current location based on communication patterns stored in the memory, a phone number corresponding to at least one of the current time and the current location is selected further based on schedule related data of a user.

5. The method of claim 4, wherein the schedule related data of the user is log data of a schedule management application.

6. The method of claim 1, wherein the displaying of the selected at least one recommendation phone number with the supplementary information comprises displaying a communication time or a communication location with respect to the selected at least one recommendation phone number.

7. The method of claim 1, wherein the selected at least one recommendation phone number comprises a plurality of phone numbers, and
    in displaying the selected at least one recommendation phone number with the supplementary information, the selected at least one recommendation phone number with the supplementary information is displayed based on a number of times of call communication or a communication duration.

8. The method of claim 1, wherein the displaying of the selected at least one recommendation phone number with the supplementary information comprises:
    displaying one of the selected at least one recommendation phone numbers with the supplementary information and a recent call communication list based on a user's input.

9. The method of claim 1, further comprising:
    determining, based on a number of times of call communication or a communication duration with respect to the counterpart's phone number, that the counterpart's phone number and the supplementary information associated with the counterpart's phone number that are stored in the first list should also be stored in the second list of contacts, and
    wherein storing, in the second list of contacts, the counterpart's phone number and the supplementary information associated with the counterpart's phone number is based on determining that the counterpart's phone number and the supplementary information associated with the counterpart's phone number should also be stored in the second list of contacts.

10. The method of claim 1, wherein the supplementary information comprises at least one of a name, an address, or an e-mail address associated with the counterpart's phone number.

11. A mobile terminal comprising:
    a pattern management unit configured to generate a communication pattern based on a counterpart's phone number and information related to a time and a location at which a call connection was established with a device using the counterpart's phone number;
    a contacts management unit configured to request supplementary information associated with the counterpart's phone number, wherein the supplementary information distinguishes the counterpart's phone number from other phone numbers and provides additional information associated with the counterpart's phone number, and is configured to store the communication pattern with the supplementary information received from the server; and a recommendation controller configured to select at least one recommendation phone number corresponding to a current time or a current location based on the communication pattern and to display the selected at least one recommendation phone number with the supplementary information;

wherein the contacts management unit is further configured to store the counterpart's phone number and the supplementary information associated with the counterpart's phone number in a first list of contacts and to store, in a second list of contacts, the counterpart's phone number and the supplementary information associated with the counterpart's phone number that are stored in the first list, based on a number of times of call communication or a communication duration with respect to the counterpart's phone number stored in the first list.

12. The mobile terminal of claim 11, wherein the contacts management unit is further configured to request the supplementary information associated with the counterpart's phone number periodically.

13. The mobile terminal of claim 11, wherein the counterpart's phone number and the supplementary information associated with the counterpart's phone are stored in the second list of contacts further based on a user input.

14. The mobile terminal of claim 11, wherein the recommendation controller is configured to select the at least one recommendation phone number corresponding to at least one of the current time or the current location further based on schedule related data of a user.

15. The mobile terminal of claim 14, wherein the schedule related data of the user is log data of a schedule management application.

16. The mobile terminal of claim 11, wherein the recommendation controller additionally displays a communication time or a communication location with respect to the selected at least one recommendation phone number.

* * * * *